United States Patent
Huang et al.

(10) Patent No.: US 9,794,137 B2
(45) Date of Patent: Oct. 17, 2017

(54) METHOD AND APPARATUS FOR ASSIGNING NETWORK RESOURCE

(71) Applicant: Telefonaktiebolaget L M Ericsson (publ), Stockholm (SE)

(72) Inventors: Vincent Huang, Sollentuna (SE); Michael Huber, Taby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 196 days.

(21) Appl. No.: 14/650,626

(22) PCT Filed: Dec. 13, 2012

(86) PCT No.: PCT/EP2012/075420
§ 371 (c)(1),
(2) Date: Jun. 9, 2015

(87) PCT Pub. No.: WO2014/090312
PCT Pub. Date: Jun. 19, 2014

(65) Prior Publication Data
US 2015/0319053 A1  Nov. 5, 2015

(51) Int. Cl.
G06F 15/173 (2006.01)
H04L 12/24 (2006.01)
H04L 12/911 (2013.01)
H04L 29/08 (2006.01)
H04L 12/927 (2013.01)
H04L 12/923 (2013.01)

(52) U.S. Cl.
CPC ........ *H04L 41/5064* (2013.01); *H04L 47/762* (2013.01); *H04L 47/808* (2013.01); *H04L 47/828* (2013.01); *H04L 67/306* (2013.01)

(58) Field of Classification Search
CPC .. H04L 41/5064; H04L 47/828; H04L 67/306
USPC ......................................................... 709/224
See application file for complete search history.

(56) References Cited

U.S. PATENT DOCUMENTS 6,728,748 B1 * 4/2004 Mangipudi ........... H04L 69/329
709/226
2010/0315968 A1 * 12/2010 Zhou ..................... H04L 1/0009
370/252

(Continued)

FOREIGN PATENT DOCUMENTS

| EP | 1011228 A2 | 6/2000 |
| EP | 2262148 A2 | 12/2010 |
| EP | 2434826 A1 | 3/2012 |

*Primary Examiner* — Alan S Chou
(74) *Attorney, Agent, or Firm* — Rothwell, Figg, Ernst & Manbeck, P.C.

(57) ABSTRACT

A method of assigning network resource between users of a network is disclosed. The method comprises the steps of monitoring a measure of user experience of users accessing a service within the network (step 120), determining a current level of user satisfaction with the service accessed for users within the network (step 130), and distributing network resource between users to minimise the number of users exhibiting a level of user satisfaction that is below a first threshold level (step 140). Also disclosed is a computer program product for carrying out a method of assigning network resource between users of a network and a system (200) configured to assign network resource between users of a network.

17 Claims, 3 Drawing Sheets

(56) References Cited

U.S. PATENT DOCUMENTS

2012/0089705 A1 4/2012 French et al.
2013/0237157 A1* 9/2013 Phan .................... H04W 24/00
 455/67.11

* cited by examiner

METHOD AND APPARATUS FOR ASSIGNING NETWORK RESOURCE

TECHNICAL FIELD

The present invention relates to a method and an apparatus for assigning network resource between users of a network. The invention also relates to a computer program product configured to carry out a method for assigning network resource between users of a network.

BACKGROUND

Telecommunications networks enable network operators and service providers to offer services to users of the network. Network resources are shared between users to enable delivery of services to many different users at one time. The principal network resource is network bandwidth, allowing delivery of services to a user who accesses the services via a user equipment device. Different services require different levels of network resource allocation to function adequately. For example, a voice conversation requiring transmission only of audio signals requires less network bandwidth than a video conversation requiring both audio and video signals. Network operators distribute network resource within a network in order to enable users to access the services they require.

User equipment for accessing telecommunications networks has developed rapidly over recent years, enabling access to ever more services on a remote basis. Current smart phones allow user access to a huge range of video and data services, and development in this field is ongoing. The increased availability of smart phones has led to a significant increase in data traffic over communications networks in recent years. Network expansion has struggled to keep pace with the growing demand for network bandwidth, and efficient allocation of network resource is consequently highly important.

Many existing systems for network resource allocation involve the creation of some sort of hierarchy, either of users or of services. For example, a network operator may prioritize certain key users within the network, those paying a higher subscription charge, singing up to a particular type of contract etc. In other examples, delivery of certain services may take priority, with for example adequate delivery of audio signals taking precedence delivery of other data services. Such hierarchical solutions are difficult to adapt to complex and constantly evolving telecommunication networks.

SUMMARY

It is an aim of the present invention to provide a method, apparatus and computer program product which obviate or reduce at least one or more of the disadvantages mentioned above.

The present invention approaches the question of network resource allocation by considering the user experience of users within the network. User experience indicates how the process of accessing or interacting with a service is experienced by a user. The concept of user experience encompasses both service functionality; the practical aspects of how well a service is functioning, and user satisfaction; the more subjective aspects of a user's perception of their service experience.

According to a first aspect of the present invention, there is provided a method of assigning network resource between users of a network, comprising monitoring a measure of user experience of users accessing a service within the network, determining a current level of user satisfaction with the service accessed for users within the network, and distributing network resource between users to minimise the number of users exhibiting a level of user satisfaction that is below a first threshold level.

Aspects of the present invention thus assign network bandwidth according to user satisfaction with current service levels, recognising the business importance not just of service levels but of customer perception of those service levels, and prioritizing user satisfaction. The present invention acknowledges that different users may have different levels of satisfaction when experiencing the same degree of functionality in the same service, and that a single user may perceive the same level of functionality differently when it applies to different services. For example a user who is very exacting for service A, being satisfied only with excellent functionality, may have lesser requirements of service B, being satisfied with merely average levels of functionality.

By assessing individual user satisfaction, rather than merely service functionality, network resource can be allocated in order to minimise the number of customers who perceive the quality of service they are experiencing to be unsatisfactory.

For the purposes of the present specification, a user experience measure is a quantitative representation of user experience for a particular user. As discussed above, the concept of user experience encompasses a wide range of different aspects of service performance and user perception. A user experience measure is a quantitative representation of this concept for a user. Many different user experience measures may be envisaged. User experience measures may directly represent user experience, or may provide an indirect representation of user experience. Direct representation may be provided by a substantially complete numerical representation of the principal aspects of user experience. Indirect representation may be provided for example by representing one aspect of user experience, or a parameter directly related to user experience, allowing other representations of user experience, or of different aspects of user experience to be determined. The user experience measure may be a numerical representation such as a scalar, vector, matrix, or multidimensional array "score" for user experience, from which service functionality and user satisfaction may be extracted. In other examples, the measure of user experience may be a numerical representation of service functionality, or of network resource allocation, from which aspects of user experience, or different aspects of user experience, may be determined for example by reference to stored data.

With reference to the above aspect of the invention, in some examples the method may further comprise storing the determined level of user satisfaction, which may allow for continual updating of a database of current user satisfaction levels. This database may for example be used for identifying users appropriate for network resource reallocation, discussion of which follows below.

In some examples, the network resource to be assigned may be network bandwidth.

In some examples, determining a current level of user satisfaction may comprise assessing the monitored measure of user experience against a satisfaction threshold level. The satisfaction threshold level may define a distinction between measures of user experience considered satisfactory and those considered unsatisfactory.

In some examples, determining a current level of user satisfaction may comprise extracting a level of user satisfaction from the measure of user experience. The level of user satisfaction may be measured on a scale, and may for example allow a more detailed representation of satisfaction level than a binary satisfied/dissatisfied assessment.

In some examples, the method may further comprise extracting a current level of service functionality from the measure of user experience, and associating the level of service functionality and corresponding user satisfaction in a stored user profile.

As discussed above, a level of service functionality may provide an indication of how well a particular service is functioning from a purely practical assessment. A user profile may associate such objective indications of service performance with user satisfaction levels arising from that performance. According to some examples, a user profile may be generic, targeted or specific. A generic user profile may be appropriate for all users, providing a generalised indication of the level of satisfaction experienced by users when encountering differing levels of service functionality. A targeted user profile may be representative of a particular group of users. A profile database may for example contain a series of targeted user profiles for different groups or types of user within the network. A specific profile may be unique to a particular user. In some examples, the database of current user satisfaction levels discussed above may be merged with user profile storage, such that user profiles may also contain current user satisfaction levels, which may continuously or periodically updated.

In some examples, the method may further comprise determining a current network resource allocation and associating the level of service functionality with the current network resource allocation in a service information database. A service information database may thus provide an indication of the level of functionality that a particular service can deliver with different levels of network resource allocation.

According to some examples, service functionality and user satisfaction may be assessed separately for different aspects of a particular service. For example, service functionality and user satisfaction may be assessed separately for voice, video and data aspects of a single integrated service. An example of such a service may be streamed media content delivered via a web page accessed by a user. Some users may have differing requirements for different aspects of particular services, and separate assessment of different aspects of service delivery may enable such requirements to be captured and integrated into the allocation process for network resource.

In some examples, determining a current level of user satisfaction may comprise reading a level of user satisfaction from an appropriate user profile. For example, where a populated user profile is available, the monitored user experience measure may comprise service functionality, and determining a current level of user satisfaction may comprise consulting a user profile to read the level of user satisfaction associated with the monitored level of service functionality for that user.

In some examples, determining a current level of user satisfaction may comprise reading a level of service functionality associated with the measure of user experience from a service information database, and reading the level of user satisfaction associated with the level of service functionality from an appropriate user profile. For example, where a populated user profile and service information database are available, the monitored user experience measure may comprise network resource allocation. Determining a current level of user satisfaction may therefore comprise consulting a service information database to determine the level of service functionality delivered by the relevant service with the current network resource allocation, and consulting a user profile to read the level of user satisfaction associated with the determined level of service functionality for that user.

The step of determining a current level of user satisfaction may thus be implemented in different ways, depending for example upon changing availability of populated user profiles and service information database, and upon the nature of the monitored user experience measure.

According to some examples, distributing network resource may comprise identifying a first user exhibiting a level of user satisfaction that is below the threshold level, identifying a second user exhibiting a level of user satisfaction that satisfies a high satisfaction criterion, and reassigning network resource from the second user to the first user.

In some examples, identifying first and second users may comprise consulting a database of current satisfaction levels for users within the network. In other examples, identifying first and second users may comprise consulting user profiles. In some examples a high satisfaction criterion may comprise exhibiting the highest satisfaction level of all users within the network. This may for example be the case where multiple satisfaction levels are possible. In other examples, including situations where a binary satisfied/dissatisfied assessment is made, the high satisfaction criterion may comprise being assessed as satisfied.

In some examples, distributing network resource may further comprise determining the amount of additional network resource required to increase the satisfaction level of the first user to above the threshold level, and reassigning the determined amount of network resource. In this manner, only the minimum amount of network resource to achieve a satisfaction level above the threshold level is reassigned. Determining the amount of network resource to be reassigned may comprise consulting a user profile to identify the level of service functionality that is associated with a satisfaction level above the threshold level for the user in question, and consulting the service information database to determine what network resource allocation will enable the identified level of service functionality.

In some examples, the method may further comprise determining the new level of satisfaction of the first user, assessing whether or not the new level of satisfaction is greater than the threshold level, and if the satisfaction level is not greater than the threshold level, repeating the steps of identifying a second user and reassigning network resource. In this manner, incremental reassignments of network resource may be made until the first user is discovered to have reached a satisfaction level above the threshold value.

According to another aspect of the present invention, there is provided a computer program product configured, when run on a computer, to execute a method according to the first aspect of the present invention. The computer program product may be stored on a computer-readable medium, or it could, for example, be in the form of a signal such as a downloadable data signal, or it could be in any other form. In some examples, the computer program product may be incorporated in core network processors. In other examples, the computer program product may comprise several sub programs, some of which may be incorporated within a core network processor and others of which may be incorporated within user equipment. Some or all of the computer program product may be made available via download from the internet.

According to another aspect of the present invention, there is provided a system for assigning network resource between users of a network, the system comprising: a monitoring unit configured to monitor a measure of user experience of users accessing a service within the network, a determining unit configured to determine a current level of user satisfaction with the service accessed for users within the network, and a distributing unit configured to distribute network resource between users to minimise the number of users exhibiting a level of user satisfaction that is below a threshold level.

In some examples, the system may be realised within a core network or within another part of a radio system supporting a network. Units of the system may be functional units which may be realised in any combination of hardware and/or software.

In some examples, the system may further comprise a user profile storage, which may be configured to hold at least one user profile associating user satisfaction with service functionality. The user profile may for example be generic, targeted or specific.

In some examples, the system may further comprise a service information database which may be configured to store network resource allocation and corresponding service functionality for services available on the network. In some examples, the determining unit may be configured to determine the current level of user satisfaction by consulting the user profile storage and/or may be configured to determine the current level of user satisfaction by consulting the user profile storage and the service information database In some examples, the distributing unit may comprise a resource management unit and an allocation unit. In some examples, the resource management unit may be configured to identify a first user exhibiting a level of user satisfaction that is below the threshold level, identify a second user exhibiting a level of user satisfaction that satisfies a high satisfaction criterion, and determine an amount of network resource for reallocation. In some examples, the allocation unit may be configured to reassign the determined amount of network resource from the second user to the first user.

In some examples, the resource management unit may be configured to determine a fixed amount of resource for reallocation, and the system may thus reassign resource in increments, while monitoring changing user satisfaction levels. In other examples, the resource management unit may be configured to consult an appropriate user profile for the first user to determine the service functionality required to achieve a user satisfaction level for the first user that is above the threshold level. The resource management may further be configured to consult a service information database to determine the increase in network resource allocation required to achieve the determined service functionality In some examples, the system may further comprise a current satisfaction level database which may be continually updated by the determining unit and which may be consulted by the resource management unit to identify the first and second users. In other examples, the resource management unit may be configured to consult user profiles to identify first and second users.

BRIEF DESCRIPTION OF THE DRAWINGS

For a better understanding of the present invention, and to show more clearly how it may be carried into effect, reference will now be made, by way of example, to the following drawings in which.

DETAILED DESCRIPTION

Figure 1:
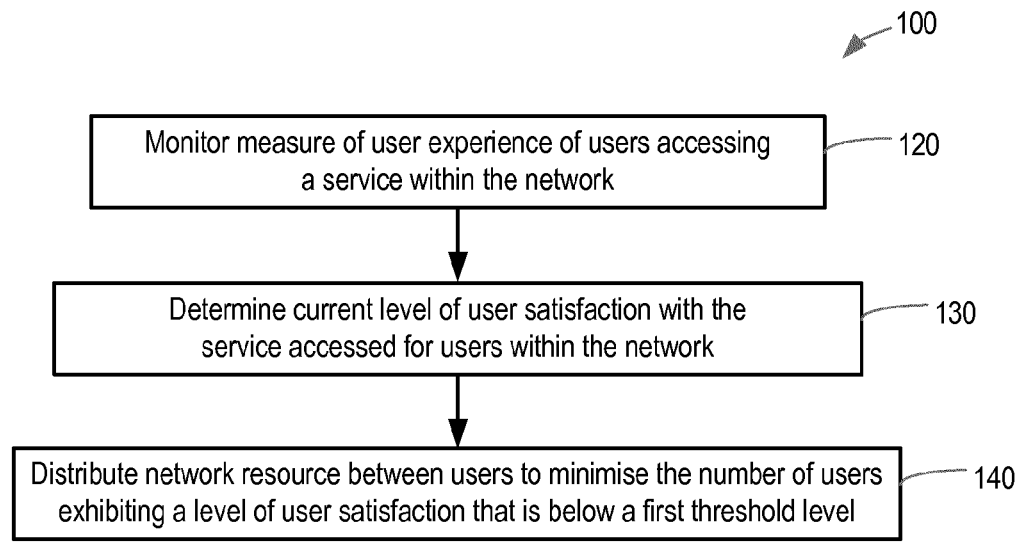
FIG. 1 is a flow chart illustrating steps in a method of assigning network resource between users of a network.

FIG. 1 illustrates steps in a method 100 of assigning network resource between users of a network. The network may for example be a telecommunications network via which users may access services offered by the network operator or other service providers. The network resource may for example be network bandwidth.

With reference to FIG. 1, a first step 120 of the method comprises monitoring a measure of user experience of users accessing a service within the network. The method then proceeds, at step 130, to determine current levels of satisfaction with the service accessed for users within the network. Finally, at step 140, the method distributes network resource between users to minimise the number of users exhibiting a level of satisfaction below a first threshold level.

As discussed above, many examples of a measure of user experience may be envisaged. For example, the measure of user experience may be a direct numerical representation of user experience. In other examples, the measure of user experience may be an indirect representation of user experience, for example a representation of service functionality or of network resource allocation. Each of these parameters is linked to user experience and may thus represent particular aspects of user experience. Monitored service functionality or network resource allocation may be combined with stored service or user data to provide further information concerning user experience, as discussed in detail below.

In one example, a direct measure of user experience may be generated from data concerning user interaction with a user equipment device. This data may for example be eye tracking data or movement data sensed by sensors mounted on or in communication with the device. A camera may for example be mounted on a user equipment device and may sense eye movement and user focus. An accelerometer may also be mounted on the device and may sense movement allowing determination of user gestures and/or movement patterns. In other examples, sensors in remote communication with the user equipment device may sense these or other aspects of user interaction with the device. This sensed interaction data may be used to generate a measure of user experience. Algorithms allowing the generation of a user experience measure from such sensed interaction data are available. In one example, monitoring a measure of user experience may comprise receiving sensed user interaction data from a user equipment device and applying an algorithm to generate a user experience measure. In other examples, an algorithm may be applied at the user equipment device, such that monitoring a user experience measure comprises receiving from the user equipment device a measure of user experience.

In other examples, a measure of user experience may be predicted from other data concerning the user such as network data. International Application number PCT/EP2012/075371 discloses a method, system and computer program product via which a user experience measure may be predicted. A prediction model such as is described in International Application PCT/EP2012/075371 may be employed to predict user experience measures, and monitoring a user experience measure may comprise receiving a predicted user experience measure from a prediction unit or service, or may comprise predicting a user experience measure using a prediction model.

In other examples, monitoring a measure of user experience may comprise receiving the measure of user experience form network processors. This may be the case when the user experience measure comprises a level of service functionality, or network resource allocation.

Referring again to FIG. 1, the step of determining a current level of user satisfaction with the service accessed for users within the network (step 130) may comprise assessing the monitored measure of user experience against a satisfaction threshold level. A satisfaction threshold level may be established to distinguish between user experience measures generally representing a satisfied user, and those which generally represent a dissatisfied user. The assessment may therefore be a binary assessment, with all user experience measures at or above the threshold level resulting in a level of user satisfaction level of 1=satisfied, and all user experience measures below the threshold level resulting in a level of user satisfaction of 0=dissatisfied. In such examples, the first threshold level considered in step 140 may be 1, such that step 140 results in distribution of network resource to minimise the number of users exhibiting a level of satisfaction below 1 i.e. dissatisfied.

In other examples, determining a current level of user satisfaction with the service accessed may comprise extracting or otherwise obtaining user satisfaction data form the user experience measure. In the case of a direct user experience measure that comprises a substantially complete numerical representation of user experience, it may be possible to extract user satisfaction data from the user experience measure. For example the user experience measure may be a matrix or multidimensional array, elements of which may represent service functionality and other elements of which may represent user satisfaction. User satisfaction may thus be extracted as a numerical score or other numerical representation which may be assessed on a scale between maximum and minimum values. In such examples, the first threshold level considered in step 140 may be a medium level score, with satisfaction levels below this score being considered unacceptable, or representative of varying levels of dissatisfaction. Satisfaction levels above the first threshold level may be considered acceptable, or representative of varying levels of positive satisfaction.

In other examples, a level of user satisfaction, in the form for example of a satisfaction score may be obtained through consideration of the user experience measure and other stored data, as discussed in further detail below.

As explained above, having obtained a current level of user satisfaction, step 140 of the method comprises distributing network resource between users to minimise the number of users exhibiting user satisfaction below a first threshold level. This may comprise users found to be dissatisfied, for example in the case of a binary satisfied/dissatisfied assessment. Alternatively, this may comprise users exhibiting a satisfaction level or score considered to be unacceptable, being representative of greater or lesser dissatisfaction with the service accessed. The threshold level may be set according to operator targets and the nature of the satisfaction data being used.

In some examples, step 140 may comprise identifying a first user exhibiting a level of user satisfaction that is below the threshold level, identifying a second user exhibiting a level of user satisfaction that satisfies a high satisfaction criterion, and reassigning network resource from the second user to the first user. The high satisfaction criterion may be set according to the satisfaction data being used. For example, in the case of a binary satisfied/dissatisfied assessment, the high satisfaction criterion may simply be the state of being satisfied, and hence all users having a satisfaction level of 1 (=satisfied) would satisfy the high satisfaction criterion. In other examples in which a more nuanced assessment of satisfaction is envisaged, the high satisfaction criterion may comprise exhibiting the highest satisfaction level of all users within the network. In still further examples, the high satisfaction criterion may be a satisfaction level or score above a second threshold value. For example, in the case of a satisfaction level measured on a scale of 1 to 100, the first threshold level distinguishing between acceptable and unacceptable levels of satisfaction may be set to be 50. The second threshold level representing the high satisfaction criterion may be set to be 80. In this manner, the method may identify those users exhibiting high levels of satisfaction as the best targets for a reduction in network resource allocation, in order to allow a satisfaction level for another user to be increased to an acceptable level. The effect of this step is to prioritize the attainment of a maximum number of users exhibiting acceptable levels of satisfaction, as opposed to a situation in which some few users have very high levels of satisfaction while other users are dissatisfied with their current experience of accessing a service.

In some examples, step 140 may further comprise determining the new level of satisfaction of the first user after reassignment of network resource from the second user, assessing whether or not the new level of satisfaction is greater than the threshold level, and if the satisfaction level is not greater than the threshold level, repeating the steps of identifying a second user and reassigning network resource. In this manner, step 140 may comprise making incremental adjustments to the network resource allocation of the first identified user, until the reallocated network resource is determined to have increased the satisfaction level of the first user to above the first threshold level. Network resource may be continually reallocated from the second identified user, or a new second user may be identified for each incremental reallocation, thus sharing the cost of finding the necessary extra resource for the first user between several second users.

In other examples, step 140 may comprise determining the amount of additional network resource required to increase the satisfaction level of the first user to above the threshold level and reassigning the determined amount of network resource. The process for determining the amount of additional resource required to increase the satisfaction level of the first user to above the threshold level is discussed below with reference to FIG. 4.

Figure 2:
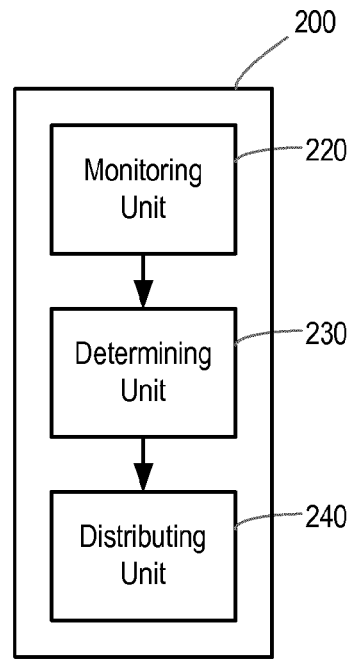
FIG. 2 is a block diagram illustrating functional elements of a system for assigning network resource between users of a network.

The method 100 of FIG. 1 may be realised by a computer program which may cause a system, processor or apparatus to execute the steps of the method 100. FIG. 2 illustrates functional units of a system 200 which may execute the steps of the method 100, for example according to computer readable instructions received from a computer program.

The system 200 may for example be realised in one or more processors, system nodes or any other suitable apparatus.

With reference to FIG. 2, the system 200 comprises a monitoring unit 220, a determining unit 230 and a distributing unit 240. It will be understood that the units of the system are functional units, and may be realised in any appropriate combination of hardware and/or software.

According to an example of the invention, the monitoring unit 220, determining unit 230 and distributing unit 240 may be configured to carry out the steps of the method 100 substantially as described above. The monitoring unit 220 may be configured to monitor a measure of user experience for users within the network, and the determining unit 230 may be configured to determine a current level of user satisfaction with the service accessed for users within the network. Finally, the distributing unit may be configured to distribute network resource between users to minimise the number of users exhibiting a level of user satisfaction that is below a first threshold level.

Some examples of the present invention may incorporate the use of a service information database and/or user profiles. In one example, a service information database may associate network resource allocation data with levels of service functionality for different services offered over the network. As discussed above, different services may require different amounts of network resource in order to be able to function. Voice calls for example require less network bandwidth than video calls. Accessing a webpage containing text and images only requires less network bandwidth than accessing a webpage containing streamed video content. The level of service functionality that may be expected for a particular service when run with varying levels of network resource allocation may be assembled in the service information database. This information may serve multiple purposes. In one example, information in a service information database may be used to allow an assessment of service functionality from monitored network resource allocation. If the network resource allocation for a user and the service being accessed by the user are known, the service information database may provide the level of service functionality that will be experienced by the user. In other examples, where a target level of service functionality has been established, a service information database may permit the amount of network resource required to achieve the target level of service functionality to be determined.

In some examples, user profiles may associate service functionality levels with user satisfaction levels for different users. It will be appreciated that different users may be more or less exacting in their expectations of service performance: user expectations and requirements may vary both between users and between services. For example, user A may be highly exacting for service 1 but have lower expectations or requirements for service 2. In contrast user B may be more easily pleased, exhibiting high levels of satisfaction for only moderate levels of service functionality across the majority of services they chose to access. This variation and individuality can be captured to a greater or lesser extent in user profiles. According to the present example, user profiles may be divided into three broad types: generic, targeted and specific. A generic user profile may be appropriate for all users within the network, providing a generalised indication of the level of satisfaction experienced by users when subjected to differing levels of service functionality. A targeted user profile may be representative of a particular group of users, such as for example business users, high consumption users etc. A specific profile may be unique to a particular user. In examples of the invention in which a binary satisfied/dissatisfied assessment is made, the user profiles may contain the satisfied/dissatisfied threshold of user experience measure for different services. In examples in which a satisfaction score is determined, user profiles may contain correlation data for the level of service functionality that equates to different levels of user satisfaction for different services. This correlation data may comprise threshold levels of service functionality corresponding to different levels of user satisfaction. A user profile may also store a current user satisfaction level for a user.

In some examples, each user may be provided with an individual user profile, and each profile may contain information identifying the user, a user group to which the user belongs, the threshold levels of service functionality corresponding to different satisfaction levels for each of the services offered on the network, and an indication of the current satisfaction level of the user. If the profile is a specific user profile, then the threshold values corresponding to different satisfaction levels will be specific to that user. If however, the profile is a targeted profile, then the threshold values will be those of the group to which the user belongs. If the profile is a generic user profile, the threshold values will be the same for all users.

Figure 3:
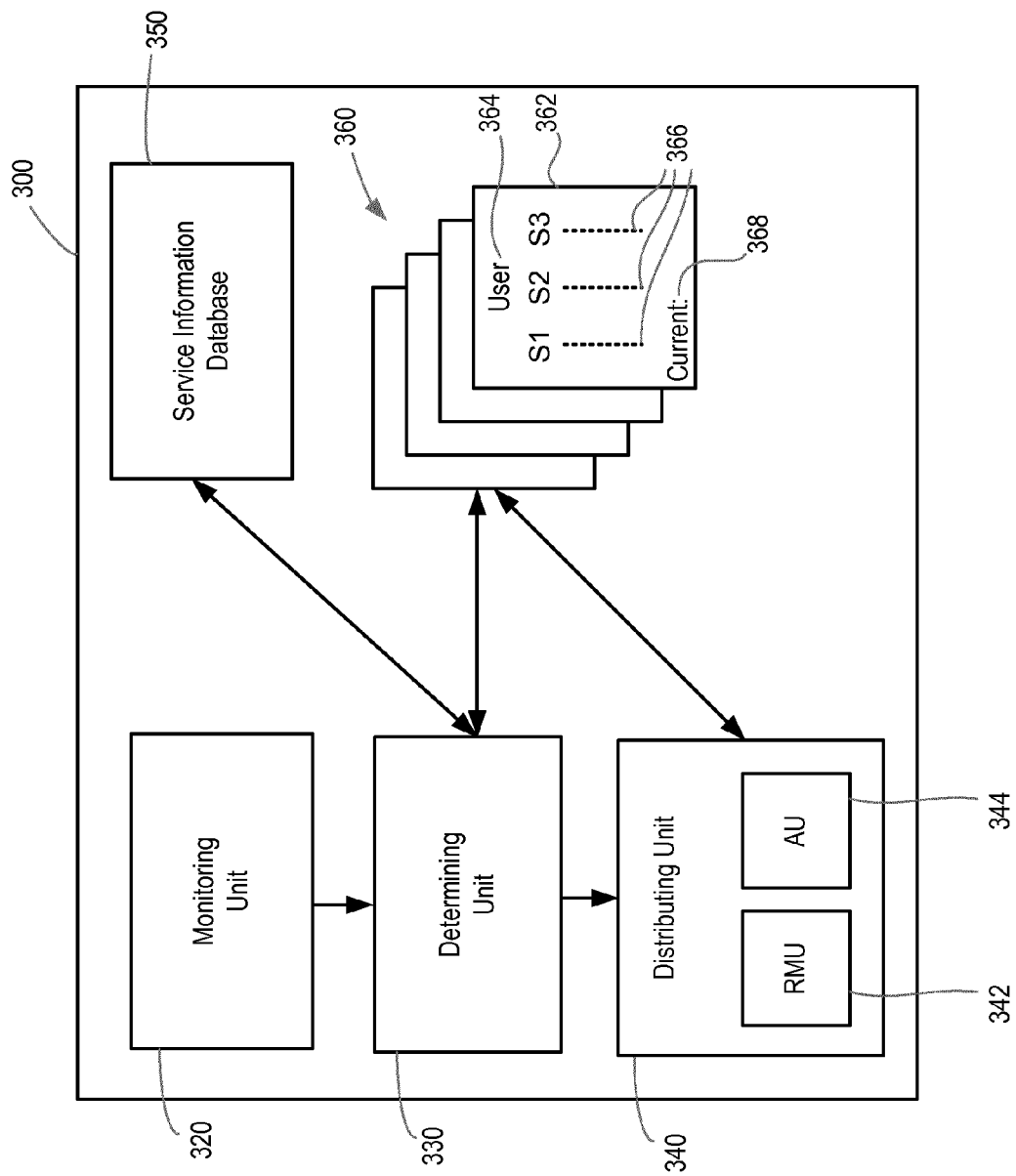
FIG. 3 is a block diagram illustrating another example of a system for assigning network resource between users of a network.

In some examples a separate database of current user satisfaction levels may be used to store current satisfaction levels of users. In such examples, an individual user profile may not be required for each user and only a single generic user profile, or a single user profile for each user group may be provided. According to these examples, the appropriate generic or group profile may be consulted for each user, before the current user satisfaction level is stored together with a unique user identifier in the current user satisfaction database FIG. 3 illustrates how a service information database and user profile storage such as a user profile database may be incorporated into a system 300 according to an example of the present invention. The system 300 comprises a monitoring unit 320, a determining unit 330, a distributing unit 340, a service information database 350 and a user profile database 360. The distributing unit 330 comprises a resource management unit 342 and an allocation unit 344. In the illustrated example, the user profile database 360 comprises a plurality of user profiles 362, each of which includes a user identifier 364, correlation data for service functionality and user satisfaction for services S1, S2, S3 etc, 366, and a current user satisfaction level 368. FIG. 3 also illustrates information flow between the various functional units, which information flow may be in different directions, depending upon whether for example the service information database 350 and user profile database 360 are being populated, consulted or updated.

Referring again to FIG. 1, examples of the method 100 may include additional steps enabling population of a service information database and user profile database. An example of how population of the databases might be accomplished is described below with reference to a user experience measure providing a direct representation of user experience. With reference to FIGS. 1 and 3, having determined the current level of user satisfaction with the service accessed at step 130, the method may further comprise extracting a current level of service functionality from the measure of user experience, and associating the level of service functionality and corresponding user satisfaction in a stored user profile 362. The method may also comprise obtaining an identification of the service accessed, thus permitting the relation between user satisfaction and service performance level to be associated with the specific service in question. As discussed above, user experience measures may be generated from sensor data or may be predicted using a prediction model. Different prediction models may be appropriate for population of different user profiles. A generic prediction model appropriate for all users may be appropriate for population and use with a generic user profile. Similarly, a targeted prediction model appropriate for use with a particular group of users may be appropriate for population of and use with targeted user profiles. Finally a specific prediction model developed for a specific user may be appropriate for population of and use with a specific user profile.

The method 100 may further comprise determining a current network resource allocation and associating the extracted level of service functionality with the current network resource allocation in a service information database 350. In some examples, both service functionality and user satisfaction may be assessed and stored separately for different aspects of a single service, including for example audio and video aspects of a single service.

Figure 4:
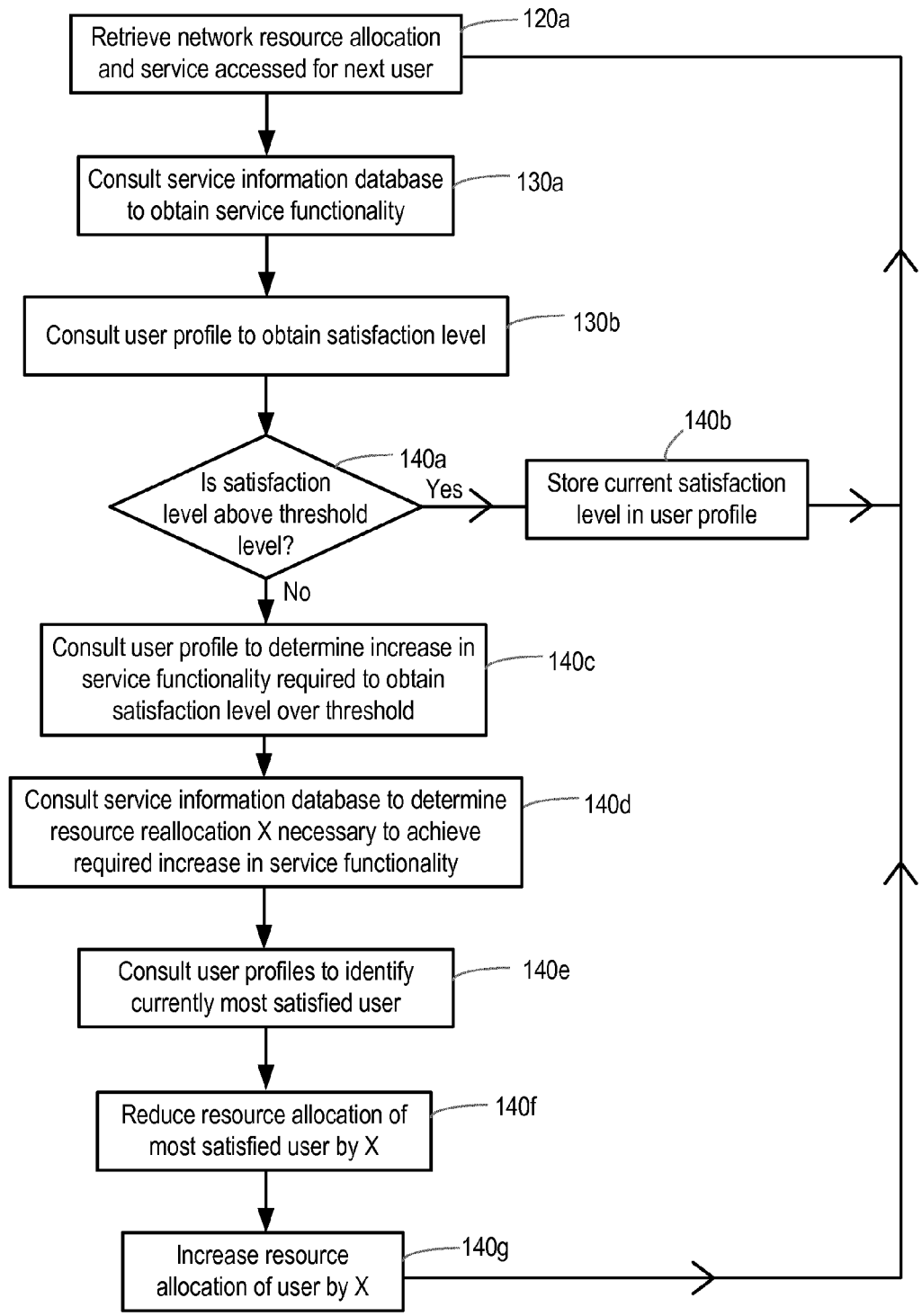
FIG. 4 is a flow chart illustrating steps in another example of a method of assigning network resource between users of a network.

FIG. 4 illustrates steps in another example of method for assigning network resource between users of a network. FIG. 4 illustrates how the steps of the method 100 illustrated in FIG. 1 may be further subdivided in order to realise the functionality described above.

The method of FIG. 4 is described below with reference to steps conducted by units of the system 300 illustrated in FIG. 3, for example according to instructions from a computer program. The method of FIG. 4 illustrates operation of the system of FIG. 3 with fully populated system information and user profile databases 350, 360. In the example shown in FIG. 4, the monitored user experience measure is an indirect representation of user experience in the form of network resource allocation. The example is described with reference to a user profile database 360 comprising individual user profiles for each user, which user profiles include an indication of current user satisfaction level.

With reference to FIGS. 3 and 4, in a first step 120a of the method 100, the monitoring unit 320 retrieves network resource allocation and service accessed for a user. This information is passed to the determining unit 330, which proceeds, at step 130a, to consult the service information database 350 to obtain the level of service functionality for the service accessed which is associated with the monitored level of network resource allocation.

Having obtained the level of service functionality, the determining unit 330 proceeds at step 130b to consult the user profile 362 for the user to obtain the satisfaction level of the user which is associated with the current level of service functionality for the service accessed. The user profile 362 of the user is identified from among the plurality of user profiles stored in the user profile database 360 by a user identifier.

The determining unit 330 then passes the obtained level of user satisfaction for the user to the distributing unit 340. The distributing unit 340 proceeds to asses, at step 140a, whether or not the obtained user satisfaction level is above the first threshold level indicating acceptable user satisfaction. If the obtained user satisfaction level is above the first threshold level (yes at step 140a), this satisfaction level is then written by the distributing unit 340 into the field of the user profile 362 in which current user satisfaction level is stored at a step 140b. The system 300 then returns to step 120a and the monitoring unit 320 retrieves network resource allocation and service accessed for another user.

If the obtained user satisfaction level is below the first threshold level (no at step 140a), the resource management unit 342 proceeds, at step 140c, to consult the user profile 362 of the user to determine the increase in service functionality that would be required to obtain a satisfaction level above the first threshold level. This may be done for example by reading form the user profile 362 the service functionality level associated with a satisfaction level for the user above the first threshold value. The resource management unit 342 then consults the service information database 350 at step 140d to determine the resource reallocation X which will be necessary to achieve the required level of service functionality. This may be achieved by reading form the service information database 350 the resource allocation level associated with the required service functionality level. The amount X of resource which must be reallocated is then calculated by subtracting the current amount of resource allocation from the required amount of resource allocation. Having determined the amount X of resource that is to be reallocated at step 140d, the resource management unit 342 consults the user profiles of the user profile database 360 at step 140e to identify the most satisfied user within the network, implementing a high satisfaction criterion of exhibiting the highest satisfaction level of users within the network. Once the resource management unit 342 has identified the most satisfied user within the network, the allocation unit 344 reduces the resource allocation of the most satisfied user by the amount X at step 140f, and increases the resource allocation of the user by the amount X. The system 300 then returns to step 120a and the monitoring 320 unit retrieves network resource allocation and service accessed for the next user. Before returning to step 120a, the distributing unit 340 may write the new satisfaction level of the user into the user profile under the current satisfaction level field. The new satisfaction level is the target level immediately above the first threshold level on the basis of which the amount X of network resource for reallocation was calculated.

The method 100 may comprise an additional step of checking, via appropriate consultation of service information database and user profile, that reducing the most satisfied user's resource allocation by X will not result in that user's satisfaction level falling below the first threshold level. If this would be the consequence of a reduction of resource allocation by X, then the method may further comprise identifying the second most satisfied user, and reducing the resource allocation of each of the most satisfied and second most satisfied users by X/2, in order to allow an increase in allocation of X for the user in question.

In other examples, the method 100 may be implemented by making incremental reallocations of network resource and checking back for the effect on user satisfaction, substantially as described above with respect to FIG. 1. In such examples, the incremental reallocations may each be of a fixed minimum amount, and a high satisfaction criterion may for example be a satisfaction level that is a particular fixed amount above the first threshold for acceptable satisfaction. The relation between satisfaction level and resource allocation may be non linear, and may vary between services. The precise criteria for selecting a second user for reduction of resource allocation may thus vary according to particular circumstances. Suitable algorithms for selecting a second user according to particular criteria and operating priorities may be employed.

It will be appreciated that a single system 300 may operate in different manners at different times. For example, in a first operational mode, the system may monitor through calculation or prediction a directly representative user experience measure, and may extract user satisfaction data and service functionality data from that measure. This data may be used both for real time network resource reallocation and to populate a service information database and user profile database. Once such databases are fully populated and available, the system may switch to a second operational mode in which a user experience measure that is an indirect representation of user experience is monitored, such as for example network resource allocation. The system may periodically switch to monitoring a directly representative user experience measure in order to allow updating of the service information database and user profiles.

It should be noted that the above-mentioned examples illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention clamed is:

1. A method of assigning network resource between users of a network, comprising:
   obtaining a first user profile for a first user of the network, wherein, for a first service, the first user profile comprises: i) information indicating a first service functionality level and information indicating a first user satisfaction level that is mapped to the first service functionality level and ii) information indicating a second service functionality level and information indicating a second user satisfaction level that is mapped to the second service functionality level;
   monitoring a user experience measure for a first user accessing the first service using a user equipment;
   determining a current level of the first user's satisfaction with the first service; and
   distributing network resource between users to minimize the number of users exhibiting a level of user satisfaction that is below a first threshold level, wherein
   determining the current level of the user's satisfaction with the first service comprises:
      a) determining, based on the monitored user experience measure, a service functionality level for the first service; and
      b) using the determined service functionality level and the user profile, determining a user satisfaction level that the user profile maps to the determined service functionality level.

2. The method of claim 1, wherein determining a current level of user satisfaction comprises assessing the monitored user experience measure against a satisfaction threshold level.

3. The method of claim 1, wherein determining a current level of user satisfaction comprises extracting a level of user satisfaction from the user experience measure.

4. The method of claim 1, wherein the method further comprises extracting a current level of service functionality from the user experience measure, and associating the level of service functionality and corresponding user satisfaction in a stored user profile.

5. The method of claim 4, wherein the method further comprises determining a current network resource allocation and associating the level of service functionality with the current network resource allocation in a service information database.

6. The method of claim 1, wherein determining a current level of user satisfaction comprises reading a level of user satisfaction from an appropriate user profile.

7. The method of claim 1, wherein determining a current level of user satisfaction comprises:
   reading a level of service functionality associated with the user experience measure from a service information database; and
   reading the level of user satisfaction associated with the level of service functionality from an appropriate user profile.

8. The method of claim 1, wherein distributing network resource comprises:
   identifying a first user exhibiting a level of user satisfaction that is below the threshold level;
   identifying a second user exhibiting a level of user satisfaction that satisfies a high satisfaction criterion; and
   reassigning network resource from the second user to the first user.

9. The method of claim 8, wherein distributing network resource further comprises:
   determining the amount of additional network resource required to increase the satisfaction level of the first user to above the threshold level; and
   reassigning the determined amount of network resource.

10. The method of claim 1, wherein the method further comprises:
    determining the new level of satisfaction of the first user;
    assessing whether or not the new level of satisfaction is greater than the threshold level; and
    if the satisfaction level is not greater than the threshold level, repeating the steps of identifying a second user and reassigning network resource.

11. The method of claim 1, wherein monitoring the measure of the first user's experience accessing the first service within the network comprises obtaining accelerometer information generated by an accelerometer contained with the user equipment used by the first user to access the first service, wherein said accelerometer information indicates one or more of: a user gesture and a movement pattern.

12. A computer program product comprising a non-transitory computer readable medium storing a code configured, when run on a computer, to execute the method of claim 1.

13. A system for assigning network resource between users of a network, the system comprising:
    a computer readable medium; and
    a processor coupled to computer readable medium, wherein the system is configured to:
    obtain a first user profile for a first user of the network, wherein, for a first service, the first user profile comprises: i) information indicating a first service functionality level and information indicating a first user satisfaction level that is mapped to the first service functionality level and ii) information indicating a second service functionality level and information indicating a second user satisfaction level that is mapped to the second service functionality level;
    monitor a user experience measure for a first user accessing the first service using a user equipment;
    determine a current level of the first user's satisfaction with the first service; and
    distribute network resource between users to minimize the number of users exhibiting a level of user satisfaction that is below a first threshold level, wherein the system is configured to determine the current level of the user's satisfaction with the first service by performing a process comprising:
  a) determining, based on the monitored user experience measure, a service functionality level for the first service; and
  b) using the determined service functionality level and the user profile, determining a user satisfaction level that the user profile maps to the determined service functionality level.

14. The system of claim 13, further comprising a user profile storage storing the first user profile.

15. The system of claim 13, wherein the system further comprises a service information database configured to store network resource allocation and corresponding service functionality for services available on the network.

16. The system of claim 13, wherein the system is further configured to:

identify a first user exhibiting a level of user satisfaction that is below the threshold level;

identify a second user exhibiting a level of user satisfaction that satisfies a high satisfaction criterion;

determine an amount of network resource for reallocation; and reassign the determined amount of network resource from the second user to the first user.

17. The system of claim 13, wherein the system is configured to monitor the measure of the first user's experience accessing the first service within the network by obtaining accelerometer information generated by an accelerometer contained with the user equipment used by the first user to access the first service, wherein said accelerometer information indicates one or more of: a user gesture and a movement pattern.

* * * * *